May 22, 1956   A. T. KORNYLAK   2,746,595
CONVEYOR BELT
Filed June 3, 1952
FIG. I
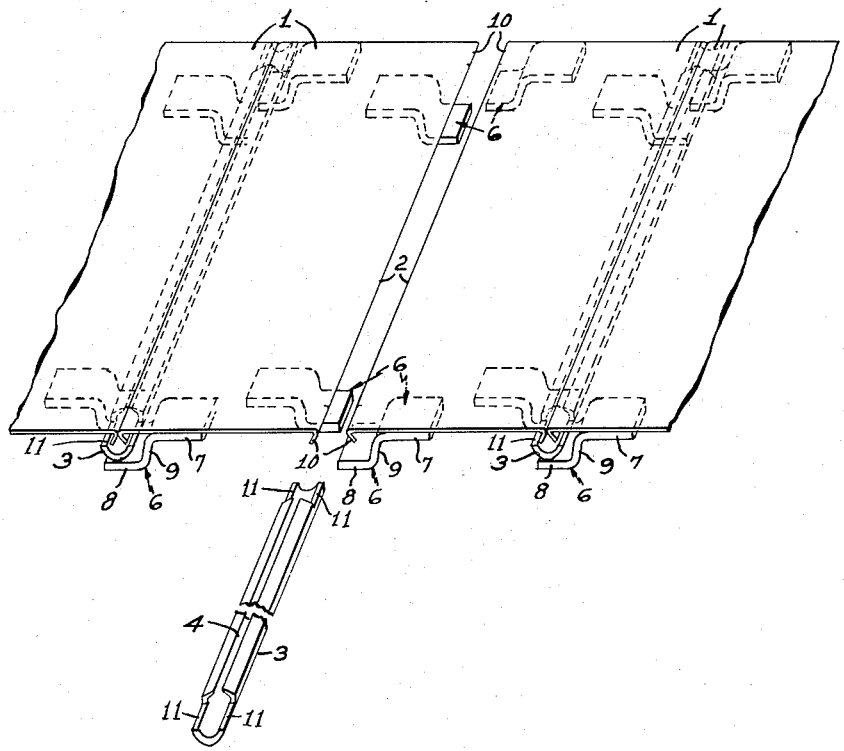
FIG. 2
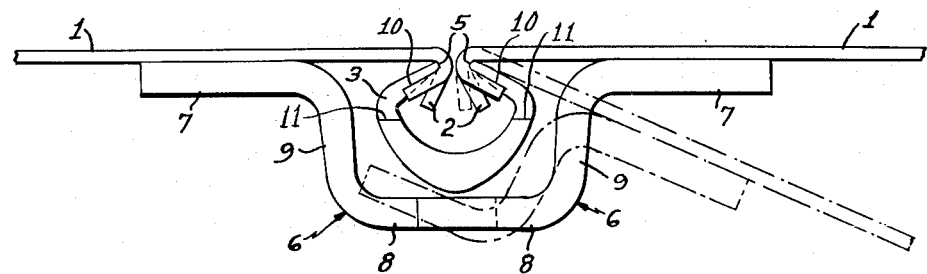
INVENTOR
Andrew T. Kornylak
BY
Pennie, Edmonds, Morton & Barrows
ATTORNEYS

United States Patent Office 2,746,595
Patented May 22, 1956

2,746,595

CONVEYOR BELT

Andrew Thomas Kornylak, Jersey City, N. J., assignor to Kornylak Engineering Corporation, Jersey City, N. J., a corporation of New Jersey Application June 3, 1952, Serial No. 291,528

3 Claims. (Cl. 198—195)

This invention relates to conveyors and particularly to endless conveyor belts comprising a plurality of serially disposed, flat, inflexible "slats" or links. According to my invention the links are joined together along abutting edges by a novel coupling which imparts the necessary flexibility to the belt, but which is of such rugged design as to enable it to communicate the belt's driving forces from link to link solely through the belt itself and without the use of auxiliary driving chains frequently relied upon.

A particular advantage of my coupling is that it transmits these driving forces substantially in the plane of the links. Prior to my invention, the design of couplings for belts of this kind was such that the driving forces transmitted between adjacent links were accompanied by bending moments which tended to distort the links at the couplings, thereby rendering the belt inoperative. A conveyor belt according to my invention is free of this undesirable characteristic. And with the elimination of this bending moment the links of a conveyor belt having the same effective carrying capacity may be constructed of lighter and more economical materials. Power requirements for driving the conveyor will be correspondingly reduced.

Furthermore, my improved coupling permits the belt to conform to paths having greater degrees of concavity or convexity without opening cracks between adjacent links. This precludes the possibility of small foreign bodies entering the coupling and interfering with its operation.

My conveyor belt is extremely simple to assemble and disassemble and requires no tools whatever. This feature greatly enhances the utility of the belt since damaged links may be easily replaced; and, in portable conveyors having an adjustable reach, the belt may be quickly and easily lengthened or shortened to accommodate the conveyor to a particular reach.

My invention will be readily understood by considering the following description in conjunction with the accompanying drawings. In the drawings:

Fig. 1 is a disassembled perspective view of the components of a section of belt showing their relation to each other.

Fig. 2 is an end view of the assembled belt section showing one link in a flexed position in phantom.

In accordance with my invention, inflexible, flat, rectangular links 1 are provided with depending flanges 2 which define a suitable included angle, for example 30 to 60 degrees, between flange and link. It is possible to form the links and flanges in any suitable way. In the case of sheet metal, such as steel or aluminum, I prefer to form them by bending downwardly narrow segments adjacent the edges of a rectangular blank of sheet metal.

The coupling member 3 is a channel of generally cylindrical shape. I have discovered that the ideal cross-sectional configuration of the channel should be similar to a cardioid as shown in Fig. 2. The channel is provided with a longitudinal slot 4 which is made of sufficient breadth to receive the combined thicknesses of two link flanges and to permit them to rotate freely about the edges 5 of the slot in the channel. Such a channel may be formed by extruding a suitable metal such as steel through a die. This cross-section has its greatest wall thickness at the bottom in the region where the greatest bending moments will occur.

The cardioid cross-section also provides the maximum interior clearance in which the flanges may rotate. The result is that a conveyor belt provided with cardioid shaped coupling members is able to conform to paths having greater curvatures than are belts with coupling members of other shapes. However, where ease and economy of construction are relatively more important, the coupling members may be formed from the tubular stock of an appropriate size by cutting a lengthwise slot in the wall of the tube. In such case it is advisable to chamfer the edges of the slot so that relatively acute fulcrums are formed. If this is done, very little allowance need be made for displacement and interference of the abutting edges of adjacent links, and a close fit between them is made possible.

On the underside of each link I provide generally Z-shaped retaining brackets 6 which prevent the disengagement of the channel member from the flanges whenever the flanges are brought into parallel relation as the belt conforms to concave curvatures. Four such retaining brackets are shown on each link in Fig. 1, two brackets on each link being positioned to cooperate with each coupling. One limb 7 of each of these brackets is secured to the underside of the link by spotwelding or other means. The other limb 8 of the bracket underlaps the coupling member. Proportioning and location of the bracket are such that the angle between the underlapping limb 8 and the cross piece 9 of the bracket are rotated into snug contact with the outer surface of the coupling member as the coupling flexes.

The coupling may be provided with locking means which prevent the channel from sliding laterally out of engagement with the flanges. Relatively short segments 10 are made by cutting the flanges across their widths near each end. These segments are bent out of the plane of the flanges proper so that the angle between a segment and its link is less than the angle between the flange and its link. The channel is notched at each end as at 11 to receive the segments as the belt flexes.

Assembly of the coupling is accomplished merely by butting together the edges of adjacent links and sliding the flanges depending therefrom into the slot of the coupling member through one if its open ends.

My invention provides a rugged, stable, endless conveyor belt suitable for many types of conveyor installations. Where table-like flatness of an operative reach of the belt is required, small rollers may be fixed to the underside of the links and made to travel along appropriate tracks.

Where the belt is to be used to convey articles on an inclined path, "flights" or transverse stops may be fixed to the upper surfaces of the links to prevent articles being conveyed from sliding down the incline.

Having fully described a particular embodiment of my invention, I claim:

1. In a conveyor belt having a plurality of inflexible flat rectangular links, a flexible coupling for adjacent links comprising plane flanges depending from the abutting edges of said adjacent links each flange defining an included angle with its respective link of not less than 30 degrees nor more than 60 degrees, a hollow generally cylindrical coupling member having a longitudinally extending slot in the wall thereof to receive the flanges of adjacent links, and a plurality of generally Z-shaped retaining brackets to maintain engagement of flanges and coupling member, one limb of each of said retaining brackets being fixed to the underside of a link and the other limb of each retaining bracket underlapping said coupling member, whereby rotation of adjacent links about their abutting edges, which rotation effects a parallel relation of said plane flanges, simultaneously rotates the brackets into retaining contact with the coupling member.

2. In a conveyor belt having a plurality of flat rectangular links, a flexible coupling for adjacent links comprising plane flanges depending from the abutting edges of said adjacent links each flange defining an included angle with its respective link of not less than 30 degrees nor more than 60 degrees, a hollow coupling member of substantially cardioidal cross-section and having at the cusp of the cross-section a longitudinally extending slot in the wall of the coupling member to receive the flanges of adjacent links, and a plurality of generally Z-shaped retaining brackets to maintain engagement of flanges and coupling member, one limb of each of said retaining brackets being fixed to the underside of a link and the other limb of each of said retaining brackets underlapping said coupling member, whereby rotation of adjacent links about their abutting edges, which rotation effects a parallel relation of said plane flanges, simultaneously rotates the brackets into retaining contact with the coupling member.

3. A flexible conveyor belt comprising a plurality of flat rectangular inflexible links, plane flanges on the transverse edges of said links depending from said links to decline an included angle of not less than 30 degrees nor more than 60 degrees between each flange and its respective link, a slotted hollow cylindrical coupling member to slidably receive the flanges on abutting edges of adjacent links, a plurality of generally Z-shaped retaining members on each link, one limb of each member fixed to the underside of a link, the other limb of each member underlapping said coupling member.

References Cited in the file of this patent
UNITED STATES PATENTS

| | | |
|---|---|---|
| 1,033,774 | Andres et al. | July 30, 1912 |
| 1,224,993 | Anderson | May 8, 1917 |
| 1,885,818 | Furbush | Nov. 1, 1932 |
| 2,430,720 | Kline et al. | Nov. 11, 1947 |

FOREIGN PATENTS

| | | |
|---|---|---|
| 11,853 | Great Britain | 1910 |